United States Patent [19]

Wehrmeister et al.

[11] 3,887,583
[45] June 3, 1975

[54] PRODUCTS AND PROCESS

[75] Inventors: Herbert L. Wehrmeister, Terre Haute, Ind.; David B. R. Johnston, Warren; Thomas B. Windholz, Westfield, both of N.J.

[73] Assignees: Commercial Solvents Corp., Terre Haute, Ind. ; by said Herbert L. Wehrmeister; Merck & Co., Inc., Rahway, N.J. ; by said David B. R. Johnston and Thomas B. Windholz

[22] Filed: Oct. 31, 1972

[21] Appl. No.: 302,414

Related U.S. Application Data

[63] Continuation of Ser. No. 729,392, May 15, 1968, abandoned.

[52] U.S. Cl. .......... 260/343.2 F; 424/279; 260/304; 260/307 D; 260/308 D
[51] Int. Cl. ............................................. C07d 9/00
[58] Field of Search ......... 260/343.2 F, 304, 307 D, 260/308 D

[56] References Cited
UNITED STATES PATENTS

| | | | |
|---|---|---|---|
| 3,535,343 | 10/1970 | Cross et al. | 260/343.2 |
| 3,585,216 | 6/1971 | Cross et al. | 260/343.2 X |

*Primary Examiner*—John M. Ford
*Attorney, Agent, or Firm*—Morton, Bernard, Brown, Roberts and Sutherland

[57] ABSTRACT

Compounds of the formula:

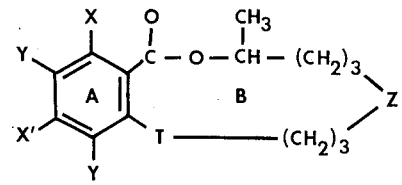

wherein T is a radical selected from the group consisting of —CH=CH— and —CH$_2$CH$_2$—; Z is >C=O, >CH$_2$, or >CHOR; R is hydrogen, alkyl, aromatic hydrocarbon radicals or acyl; X is hydrogen, —OR or —OR'; R' is benzoxazolyl, benzothiazolyl, or phenyltetrazolyl, X' is X or tetrahydropyranyloxy; Y is hydrogen, or hydroxyl; and unless at least one of X and X' is tetrahydropyranyloxy, benzoxazolyloxy, benzothiazolyloxy, or phenyltetrazolyloxy, then at least one of X and X' is hydrogen; and animal feeds containing growth promoting amounts of these compounds. The novel compounds can be prepared from zearalenone and appropriate derivatives or zearalenone by (*a*) etherifying at least one or both of the substituents in the 2 and 4 positions (the X substituents) of the A ring with certain heterocyclic compounds and subjecting the ether to hydrogenolysis to cleave the heterocyclic ether radical and replace at least one of these substituents with hydrogen and (*b*) when producing compounds having at least one hydroxyl, amino or nitro substituent in the 3 and 5 positions (the Y substituents) of the A ring, nitrating either one or both, depending upon the final compound desired, of the 3 and 5 positions of compounds produced by process (*a*) and converting, when desired, the nitro substituent to an amino or a hydroxyl substituent. Alternatively, compounds having at least one of a hydroxyl, amino or nitro substituent can be used as a starting material in process (*a*).

40 Claims, No Drawings

PRODUCTS AND PROCESS

This is a continuation, of application Ser. No. 729,392, filed May 15, 1968, now abandoned.

The present invention relates to new compounds, processes for their preparation, and animal feeds containing growth promoting amounts of these compounds.

An object of the present invention is to provide compounds which exhibit estrogenic activity or aid in increasing the rate of growth in meat-producing animals, e.g., cattle, lamb and swine, or are useful as intermediates in the preparation of such compounds. The compounds of this invention are illustrated by the formula (hereafter Formula A):

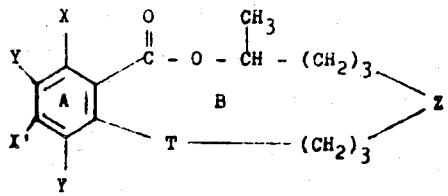

wherein T is —CH=CH— or —CH$_2$CH$_2$—; Z is any non-deleterious, chemically suitable substituent including >C=O, >CH$_2$ or >CHOR; R is any non-deleterious, chemically suitable substituent including (1) hydrogen; (2) substituted or unsubstituted alkyl, e.g., containing from about 1 to 15 carbon atoms including lower alkyl such as methyl, ethyl, hexyl, etc.; (3) acyl radicals generally containing from about 1 to 25 or more carbon atoms including lower acyclic radicals, e.g. acetyl, propionyl, valeryl and isobutyroyl: or (4) substituted or unsubstituted aromatic hydrocarbon radicals, for instance monocyclic aryl and aralkyl containing up to about 10 carbon atoms or more, e.g., benzyl; X is hydrogen, or —OR or —OR'; R' is benzoxazolyl, benzothiazolyl or phenyltetrazolyl; X' is X or tetrahydropyranyloxy: Y is hydrogen, amino, nitro or hydroxyl; and unless at least one of X and X' is tetrahydropyranyloxy, benzoxazolyloxy, benzothiazolyloxy, or phenyltetrazolyloxy, then at least one of X and X' is hydrogen. The compounds can be considered as having two rings, an A ring and a B ring as designated in the formula and when positions on the rings are referred to in the specification and claims, the carbon atom in the A ring attached to the

group in the B ring is designated the number one position with counterclockwise numbering in the A ring. Counterclockwise numbering is also used in the B ring. The presence of an asymetric carbon atom in the group

at the 10' position of the B ring provides the possibility of optical isomers and when Z is >CHOR, diastereoisomers are provided.

The compounds can be administered to animals by any suitable method including oral and parenteral administrations. For example, the compounds can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, or course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain byproducts; animal protein substances, such as those found in fish meal and meat scraps, vegetable proteins like soybean oil meal or peanut oil meal; vitamins and vitamin-containing materials, e.g., vitamin A and D mixtures, riboflavin supplements and other vitamin B complex members; and bone meal and limestone to provide minerals. A type of convenetional feed material for use with cattle includes alfalfa hay and ground corn cobs together with supplementary vitamins and vitamin-containing substances if desired. Other suitable utilities for the final product-compounds of the present invention include use for antiosteoporosis activity, anti-implantation activity, separation of anabolic and estrogenic effects, application in fertility control and as a hormonal supplement.

The compounds of the present invention can be produced from the compound:

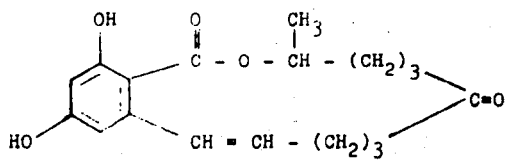

hereinafter referred to as "zearalenone", or its appropriate derivatives. The term conforms with the nomenclature set forth in an article in *Tetrahedron Letters*, Pergamon Press, Ltd., No. 27, pp. 3109–14 (1966). Zearalenone has also been referred to as fermentation estrogenic substance (P.E.S.). Zearalenone can be prepared according to the disclosure of U.S. Pat. No. 3,196,019. Racemic d,l-zearolenone l-zearalenone and the mono- and di-ethers thereof can be prepared in accordance with a synthesis described in U.S. patent application Ser. No. 609,995 filed Jan. 18, 1967 (184–530A), herein incorporated by reference. The individual d- or l- form of zearalenone can be provided by using conventional procedures (for instance see *Organic Chemistry*, Henry Gilman, John Wiley and Sons, Inc., Second Edition, Volume I, Chapter 4, Part IV 3) to resolve intermediates produced during the synthesis and completing the synthesis using the d- or l- form of the intermediate.

In accordance with the process of the present invention, compounds having Formula A are prepared from compounds having the following formula (hereafter Formula B):

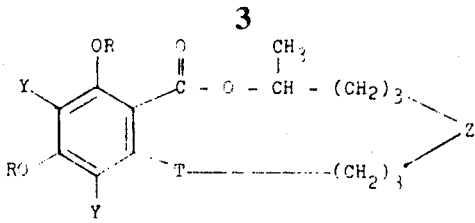

wherein T, R, Y and Z have the same meaning as they have in Formula A, by selectively etherifying at least one of the substituents in the 2 and 4 positions with a heterocyclic compound to provide the corresponding intermediate and cleaving the heterocyclic ether radical(s) by hydrogenolysis to produce compounds covered by Formula A. Advantageously, R in the position(s) selected for heterocyclic etherification is hydrogen. The general procedure is described in *J. Amer. Chem. Soc.* 88 (18), 4271–3 (1966). Suitable heterocyclic etherifying agents include those containing from about 5 to 20 carbon atoms, e.g. 2-chlorobenzothiazole; 2-chlorobenzoxazole; and 1-phenyl-5-chlorotetrazole. The etherification is advantageously conducted in the presence of potassium carbonate in a suitable solvent, for instance acetone. The hydrogenolysis of the heterocyclic ether, preferably in a solvent, e.g. ethanol or benzene, is advantageously conducted in the presence of hydrogen at hydrogenolyzing conditions including hydrogenolyzing temperatures, e.g. from about 50 to 100°C., and superatmospheric pressure conditions, e.g. from about 15 to 100 p.s.i. using a Group VIII metal, particularly platinum or palladium on a suitable carrier, e.g. charcoal support. Generally, the catalyst contains from about 0.01 to about 10 weight percent of the catalytic metal. The catalyst is used in a ratio of generally from 0.02 to 2 grams of catalyst, preferably about 0.1 to 1 gram per gram of compound to be subject to hydrogenolysis.

Hydroxyl groups in the A ring of the starting compounds can be protected against cleavage by converting the hydroxyl groups to ethers, e.g., methyl ethers, as taught in U.S. Pat. No. 3,239,342 and subsequently removing the masking group to regenerate the hydroxyl group. The hydroxyl group can be regenerated from, for example, a methyl ether by a hydrolytic cleavage or by refluxing in acetic acid solution with hydrobromic acid. Aluminum chloride and, preferably, boron trichloride and boron tribromide are other effective dealkylating agents.

Benzyl groups are also suitable masking agents and can be removed by catalytic reduction. Benzyl ethers are taught in application Ser. No. 620,259, filed Mar. 3, 1967. U.S. Pat. Nos. 3,239,354 and 3,239,347 describe compounds where T is —$CH_2$—$CH_2$— and R is acyl. Compounds where T is —$CH_2$—$CH_2$— and Z is >CHOH and compounds where T is —$CH_2$—$CH_2$— or —CH=CH— and Z is >$CH_2$ are described, respectively, in U.S. Pat. No. 3,239,345 and U.S. Pat. No. 3,239,341.

The compounds, where Z is >CHOH provide intermediates for the production in this position of O-alkyl and O-acyl-substituted compounds. For example, O-alkyl substituted compounds can be produced by alkylation of the hydroxyl groups as taught in U.S. Pat. No. 3,239,342. An acyl derivative can be produced as taught in U.S. Pat. No. 3,239,347 by reaction with the corresponding anhydride.

The 4-tetrahydropyranyl derivatives can be prepared by suspending the corresponding 4-phenols in dihydropyran with a few drops of concentrated HCl and stirring the mixture at room temperature. The desired tetrahydropyranyl ether can be isolated by pouring the mixture into aqueous alkaline solution and extracting the products with an appropriate solvent.

In another aspect of the present invention, compounds of Formula A wherein at least one Y is nitro, amino or hydroxyl are produced by selectively nitrating at least one of the 3 and 5 positions on the A ring according to a procedure described in application Ser. No. 678,177 filed Oct. 26, 1967 (184-466A) to produce nitro compounds and, when desired, reducing to produce the corresponding amino compounds. When the hydroxyl substituent is desired, the amino substituent is converted by way of diazotization to provide the hydroxyl substituent. The nitration is conducted using nitration conditions, advantageously with fuming nitric acid at low temperatures, e.g. 0° to 5°C.

The reduction of the nitro substituent is conducted using reducing conditions to produce the corresponding amino substituent, for instance with hydrogen in accordance with one procedure using a group VIII metal, particularly platinum or palladium catalyst on a suitable carrier, e.g. charcoal. Generally, the catalyst contains from about 0.01 to about 10% of the catalytic metal. The catalyst is used in a ratio of generally from 0.02 to 2 grams of catalyst, preferably about 0.1 to 0.5 gram, and particularly about 0.2 gram catalyst per gram of compound. The reduction may be carried out while the compound is dissolved in a suitable solvent, e.g. an alcohol, especially a lower alkanol such as 2-propanol, methanol, ethanol, and acid, e.g. acetic acid, etc., preferably methanol, at ambient temperatures, e.g. from about 15° to 40°C., and ambient pressures, since only the presence of hydrogen is required; however, it is preferred to utilize an elevated pressure, e.g. from about 1 to 50 atmospheres of hydrogen.

To produce the corresponding hydroxyl groups, the compounds containing the amino substituent are treated with sodium nitrite and dilute sulfuric acid at 0° to 5°C. to produce the diazo compounds. The hydroxyl compounds are those prepared from the diazo compounds by heating an aqueous solution of the diazo compound to about 100°C.

The following specific examples will serve to illustrate the invention but are not to be considered limiting.

EXAMPLE I

The production of dideoxyzearalane, a compound of Formula A where T is —$CH_2CH_2$—, X, X' and Y are hydrogen and Z is >$CH_2$, i.e.

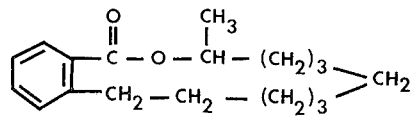

was accomplished by the following procedure.

A mixture of 30.6 grams of zearalane, 34.8 grams of 2-chloro-benzoxazole, 35.4 grams of $K_2CO_3$ and 400 ml. of acetone was heated in a flask equipped with a reflux condenser while being stirred at reflux temperature for 24 hours. The reaction mixture was cooled, filtered, and the filter cake was washed with acetone. The filtrate was concentrated and cooled to provide a precipitate which was 45.7 grams of dibenzoxazolyl ether of zearalane having a melting point of 120.5–122.5°C.

A solution containing 46.1 grams of the dibenzoxazolyl ether of zearalane in 450 ml. of ethanol was reduced in a hydrogenator (shaking bomb) which contained 5 grams of 5% palladium on charcoal. The diether hydrogenolyzed at a temperature of 70°C. at a hydrogen pressure of 50 p.s.i. The solution was cooled and filtered and the filtrate was evaporated to 43.5 grams of a mixture of liquid and solid.

The residue was heated twice with 300 ml. portions of n-hexane to dissolve the dideoxyzearalane leaving benzoxazolone as insoluble residue.

The dideoxyzearalane-containing hexane solution, a clear yellow filtrate, was evaporated to dryness leaving 22.5 grams of a viscous oil. This oil was redissolved in hexane and the hexane solution was washed with a 5% sodium hydroxide solution, 3 N hydrochloric acid, and water. The solution was then char treated (Darco G-60), filtered, and evaporated to yield 20.8 grams (89%) of d-dideoxyzearalane as a water-white oil. An N.M.R. spectral analysis was consistent with the assigned structure for dideoxyzearalane, i.e., that both hydroxyl groups had been removed from zearalane. A sample of this product, dideoxyzearalane, had optical activity of $[\alpha]546^{25}$, +92 (1% concentration in methanol) and the following analysis:

|   | Calculated ($C_{18}H_{26}O_2$) | Found |
|---|---|---|
| C | 78.8 | 78.6 |
| H | 9.55 | 9.94 |

The following are specific examples of animal feed compositions of this invention useful for increasing the rate of growth and feed efficiency of young animals to market weight.

EXAMPLE II

For young beef cattle, i.e., calves to yearlings running to two year olds, each animal is given 5 to 20 milligrams per day of the compound product in Example I intimately admixed in about 18 to 22 pounds per head per day of a complete pelleted ration for about 180 days. The complete pelleted ration includes in addition to the compound of Example I the following:

| Barley | 40–43% |
|---|---|
| Mollasses Dried Beet Pulp | 34.5–37.5% |
| Alfalfa Pellets | 8.0% |
| Tallow | 2.5% |
| Calcium Carbonate | .30% |
| Urea | .30% |
| Phosphorus Source | .40% |
| Salt | .50% |
| Molasses | 10.00% |
| Trace Mineral | 0.5% |
| Vitamin A | 2–4 MMIU/Ton |

(NOTE:
Milo or corn, for example, can be substituted for the barley.)

The compound of Example I is admixed with the above ingredients in a stationary blender or a feed mix truck in the following amounts in grams per ton to provide an appropriate complete pelleted feed with dosage levels ranging from 5 to 90 milligrams per head per day.

| Grams/Ton | Mg/Head/Day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

EXAMPLE III

For young swine, i.e., 6 week old pigs to about 100 pound pigs, each animal is given 5 to 20 milligrams per day of the compound of Example I intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example I intimately admixed in about 5½ to 10 pounds per head per day of a finisher ratio until it reaches market weight of about 220 pounds. The grower and finisher ration include in addition to the compound of Example I the following:

|  | Grower | Finisher |
|---|---|---|
| Ground Yellow Corn | 77% | 86.7% |
| Soybean Meal (44% protein) | 16% | 6.5% |
| Meat and Bone Scraps (50% protein) | 2.5% | 2.5% |
| Dehydrated Alfalfa Meal (17%) | 2.5% | 2.5% |
| Steamed Bone Meal | 0.5% | 0.5% |
| Ground Limestone | 0.5% | 0.3% |
| Iodized Salt | 0.5% | 0.5% |
| Vitamin, Antibiotic and Trace Mineral Premix | 0.5% | 0.5% |

EXAMPLE IV

Essentially the same procedure employed in Example I was followed to produce a compound (dideoxyzearalanone) of Formula A where T is —$CH_2CH_2$—, X, X' and Y are hydrogen and Z is >C=O, i.e.

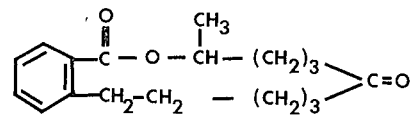

except zearalenone was used instead of zearalane, and 1-phenyl-5-chlorotetrazole was used instead of 2-chlorobenzoxazole.

EXAMPLE V

Zearalenone is reacted with dihydropyran to produce the following compound (hereafter Example V(1) Compound) where X' is a tetrahydropyranyloxy radical:

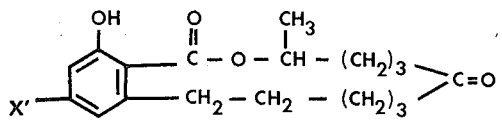

The reaction is conducted using a suspension of 8.0 g. of zearalenone in 8 ml. dihydropyran and 4 drops of concentrated hydrochloric acid and stirring the suspension at room temperature for 4 hours. An additional 8 ml. of dihydropyran is added and the suspension is stirred overnight. The resultant solution is poured into saturated sodium bicarbonate solution and extracted with ethyl acetate. The extract is washed with sodium hydroxide solution, water, and sodium chloride solution, dried using MgSO₄ and evaporated under reduced pressure. The residue is dissolved in methanol and cooled to crystallize Example V(1) compound and after repeated crystallization of a portion of the first crop, a sample of Example V(1) Compound (m.p. 159°-160°C.) is obtained.

Essentially the same procedure employed in Example I was followed to produce a compound of Formula A where T is —CH₂CH₂—, X and Y are hydrogen, X' is tetrahydropyranyloxy and Z is >C=O, i.e.

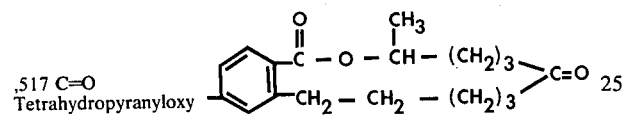

except Example V(1) Compound was used instead of zearalane, and 1-phenyl-5-chlorotetrazole was used instead of 2-chlorobenzoxazole.

EXAMPLE VI

Essentially the same procedure employed in Example I was followed to produce a compound of Formula A where T is —CH₂CH₂—, X is hydroxyl, X' and Y are hydrogen, and Z is >C=O, i.e.

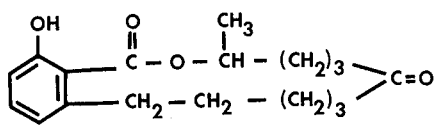

except a compound of Formula B where the R in the OR group in the 2 position of the A ring was benzyl, the R in the OR group in the 4 position was hydrogen, T was —CH=CH—, and Z was >C=O, i.e.

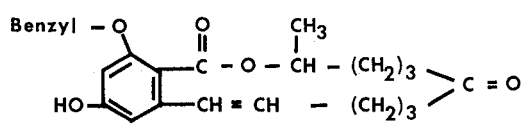

hereafter Example VI(1) Compound was used instead of zearalane and 1-phenyl-5-chlorotetrazole was used instead of 2-chloro-benzoxazole to produce an intermediate compound of the formula

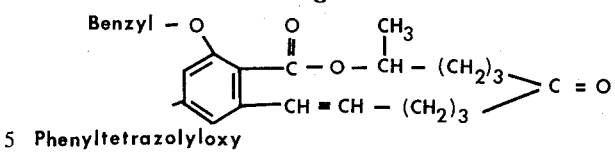

Phenyltetrazolyloxy which has subjected to hydrogenolysis.

Example VI(1) Compound can be prepared by refluxing Example V(1) Compound with benzyl chloride in methanol and potassium carbonate for 18 hours followed by treatment on a steam bath with 2.5 N hydrochloric acid and dioxane to remove the tetrahydropyranyl radical.

EXAMPLE VII

Essentially the same procedure employed in Example I was followed to produce a compound of formula A where T is —CH₂CH₂—, X and Y are hydrogen, X' is hydroxyl, and Z is >C=O, i.e.

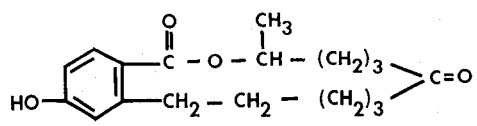

except Example V(1) Compound was used instead of zearalane and 1-phenyl-5-chlorotetrazole was used instead of 2-chlorobenzoxazole to produce the intermediate

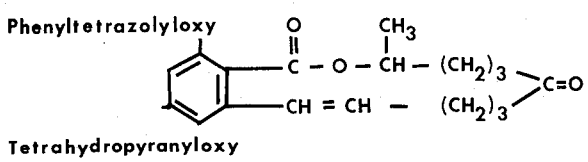

which was subjected to hydrogenolysis, and acid hydrolysis.

EXAMPLE VIII

A mixture of compounds, Example VIII(1) Compound and Example VIII(2) Compound, respectively of the formulae

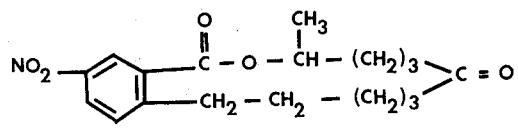

Example VIII(1) Compound     and

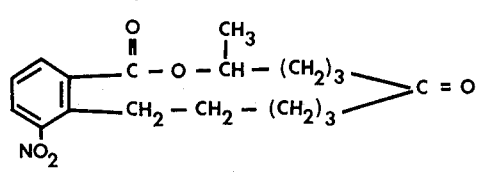

EXAMPLE VIII(2) Compound is produced by reacting dideoxyzearalanone, for instance as produced in Example IV, with fuming nitric acid at a temperature of 0°C. The compounds are separated using conventional procedures, for instance, column chromatography or crystallization.

EXAMPLE IX

A compound of the formula

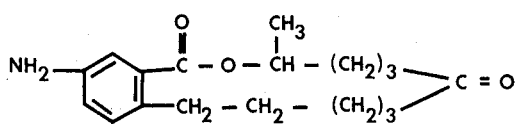

was produced by reducing Example VIII(1) Compound in methanol in the presence of a palladium-on-charcoal catalyst. The amino group was converted to a hydroxyl group by contacting the amino compound with sodium nitrite and dilute sulfuric acid at 0°C. to produce a diazo intermediate and then by heating the latter compound to 100°C. to produce the corresponding 3-hydroxy compound.

EXAMPLE X

A compound of the formula

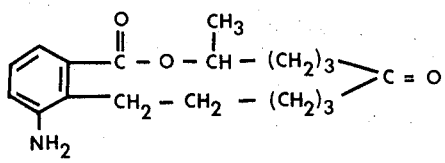

as starting compounds wherein the values for Z, T, and R are set forth in Table I below for the respective Examples. The intermediate and final products produced from these starting compounds correspond in structure to the general formula

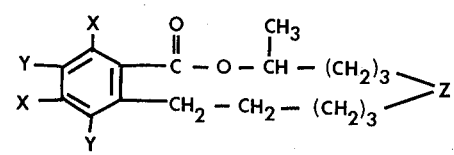

and the values for X, X', Y, and Z of the intermediate products are set forth in Table II and the final products in Table III. The intermediate products are produced in the etherification phase and the final products are produced in the cleaving phase.

TABLE I

| EXAMPLE | Starting Compounds | | | | Etherifying Agent |
|---|---|---|---|---|---|
| | R (2 position) | R (4 position) | T | Z | |
| XI | H | H | —(CH$_2$)$_2$— | >C=O | 2-chlorobenzothiazole |
| XII | CH$_3$ | H | do. | >CHOCH$_3$ | 2-chlorobenzoxazole |
| XIII | H | acetyl | do. | >CH$_2$ | do. |
| XIV | acetyl | H | —CH=CH— | >C=O | do. |
| XV | H | CH$_3$ | do. | >CHOH | do. |
| XVI | H | benzyl | do. | >C< H, O—C—CH$_3$ O | do. |
| XVII | H | benzyl | do. | >CHO—Benzyl | do. |

TABLE II

| EXAMPLE | X | X' | Y | T | Z |
|---|---|---|---|---|---|
| XI | benzothiazolyloxy | benzothiazolyloxy | H | —CH$_2$CH$_2$— | >C=O |
| XII | —OCH$_3$ | benzoxazolyloxy | do. | do. | >CHOCH$_3$ |
| XIII | benzoxazolyloxy | acetoxy | do. | do. | >CH$_2$ |
| XIV | acetoxy | benzoxazolyloxy | do. | —CH=CH— | >C=O |
| XV | benzoxazolyloxy | —OCH$_3$ | do. | do. | >CHOH |
| XVI | do. | benzyloxy | do. | do. | >C< H, O ,46 O—C—CH$_3$ |
| XVII | do. | do. | do. | do. | >CHO—Benzyl | was produced using essentially the same procedure used in Example IX except Example VIII(2) Compound was used instead of Example VIII(1) Compound. The corresponding compound having a hydroxyl group instead of the amino group was also produced by essentially the same procedure.

EXAMPLES XI to XVII

Essentially the same procedure used in Example I is followed using compounds of the general formula

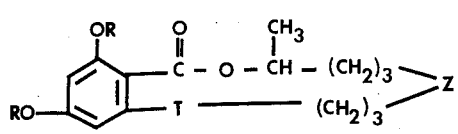

TABLE III

| EXAMPLE | X | X' | Y | Z |
|---|---|---|---|---|
| XI | H | H | H | >C=O |
| XII | —OCH$_3$ | H | do. | >CHOCH$_3$ |
| XIII | H | acetoxy | do. | >CH$_2$ |
| XIV | acetoxy | H | do. | >C=O |
| XV | H | —OCH$_3$ | do. | >CHOH |
| XVI | do. | —OH | do. | >C< H, O O—C—CH$_3$ |
| XVII | do. | do. | do. | >CHOH |

EXAMPLES XVIII TO XXX

Animal growth promoting amounts of each of the products produced in accordance with Examples V to XVII are incorporated in animal feeds in essentially the same manner as set forth in Example II.

It is claimed:

1. A compound having the formula:

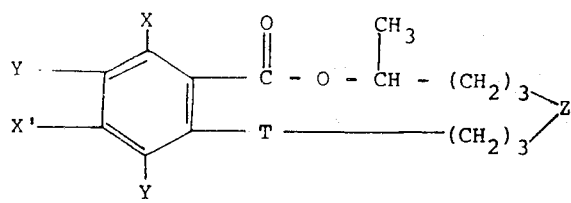

wherein T is a radical selected from the group consisting of —CH=CH— and —CH₂CH₂—; Z is > CH₂; R is selected from the group consisting of hydrogen, lower alkyl, lower acyclic carboxylic acid acyl radicals, and monocyclic carbocyclic aralkyl radicals containing up to about 10 carbon atoms; X is selected from the group consisting of hydrogen, —OR and —OR'; R' is selected from the group consisting of benzoxazolyl, benzothiazolyl and phenyltetrazolyl; X' is selected from the group consisting of X and tetrahydropyranyloxy; Y is selected from the group consisting of hydrogen, amino, nitro and hydroxyl, and provided that unless at least one of X and X' is selected from the group consisting of tetrahydropyranyloxy, benzoxazolyloxy, benzothiazolyloxy, and phenyltetrazolyloxy, then at least one of X and X' is hydrogen.

2. A compound of claim 1 wherein at least one Y is amino.
3. A compound of claim 2 wherein T is —CH₂CH₂—.
4. A compound of claim 1 wherein at least one Y is nitro.
5. A compound of claim 4 wherein T is —CH₂CH₂—.
6. A compound of claim 1 wherein R is selected from the group consisting of hydrogen, lower alkyl, lower alkanoyl radicals and alkyl benzyl radicals containing up to about 10 carbon atoms.
7. Dideoxyzearalane of the formula:

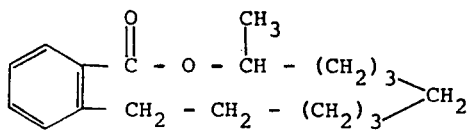

8. A compound having the formula:

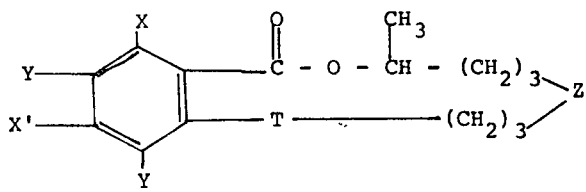

wherein T is a radical selected from the group consisting of —CH=CH— and —CH₂CH₂—; Z is a radical selected from the group consisting of > C=O, > CH₂, and > CHOR; R is selected from the group consisting of hydrogen, lower alkyl, lower acyclic carboxylic acid acyl radicals, and monocyclic carbocyclic aralkyl radicals containing up to about 10 carbon atoms; X is selected from the group consisting of hydrogen, —OR and —OR'; R' is selected from the group consisting of benzoxazolyl, benzothiazolyl and phenyltetrazolyl; X' is selected from the group consisting of X and tetrahydropyranyloxy; Y is selected from the group consisting of hydrogen, amino, nitro and hydroxyl, wherein at least one Y is amino, nitro or hydroxyl; and provided that unless at least one of X and X' is selected from the group consisting of tetrahydropyranyloxy, benzoxazolyloxy, benzothiazolyloxy, and phenyltetrazolyloxy, then at least one of X and X' is hydrogen.

9. A compound having the formula:

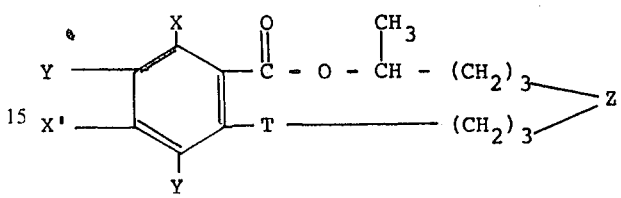

wherein T is a radical selected from the group consisting of —CH=CH— and —CH₂CH₂—; Z is a radical selected from the group consisting of > C=O, > CH₂, and > CHOR; R is selected from the group consisting of hydrogen, lower alkyl, lower acyclic carboxylic acid acyl radicals, and monocyclic carbocyclic aralkyl radicals containing up to about 10 carbon atoms; X is selected from the group consisting of hydrogen, —OR and —OR'; R' is selected from the group consisting of benzoxazolyl, benzothiazolyl and phenyltetrazolyl; and X' is selected from the group consisting of X and tetrahydropyranyloxy; Y is selected from the group consisting of hydrogen, amino, nitro and hydroxyl, and provided that at least one of X or X' is —OR'.

10. A compound having the formula:

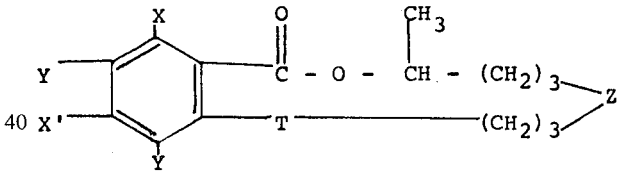

wherein T is —CH₂CH₂—; Z is a radical selected from the group consisting of > C=O, > CH₂, and > CHOR; R is selected from the group consisting of hydrogen, lower alkyl, lower acyclic carboxylic acid acyl radicals, and monocyclic carbocyclic aralkyl radicals containing up to about 10 carbon atoms; X is selected from the group consisting of hydrogen, —OR and —OR'; R' is selected from the group consisting of benzoxazolyl, benzothiazolyl and phenyltetrazolyl; X' is selected from the group consisting of X and tetrahydropyranyloxy; Y is selected from the group consisting of hydrogen, amino, nitro and hydroxyl; and provided that unless at least one of X and X' is selected from the group consisting of tetrahydropyranyloxy, benzoxazolyloxy, benzothiazolyloxy, and phenyltetrazolyloxy, then at least one of X and X' is hydrogen.

11. The compounds of claim 10 wherein Z is > CH₂.
12. A compound of claim 10 wherein T is —CH₂CH₂— and Y is hydrogen.
13. A compound of claim 12 wherein Z is > CH₂.
14. A compound of claim 13 wherein X is hydrogen.
15. A compound of claim 13 wherein X' is hydrogen.
16. A compound of claim 13 wherein X and X' are hydrogen.

17. A compound of claim 10 wherein Z is >C=O.

18. A compound of claim 17 wherein X and X' are hydrogen.

19. A compound of claim 18 wherein Y is the 3 position is hydroxyl and Y in the 5 position is hydrogen.

20. A compound of claim 18 wherein Y in the 3 position is hydrogen and Y in the 5 position is hydroxyl.

21. A compound having the formula:

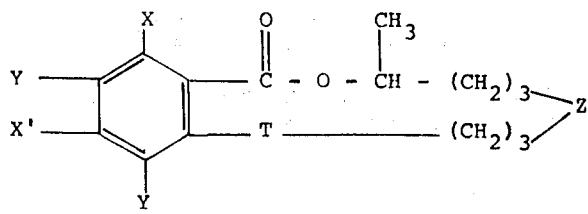

wherein T is a radical selected from the group consisting of —CH=CH— and —CH$_2$CH$_2$—; Z is a radical selected from the group consisting of >C=O, >CH$_2$, and >CHOR; R is selected from the group consisting of hydrogen, lower alkyl, lower acyclic carboxylic acid acyl radicals, and monocyclic carbocyclic aralkyl radicals containing up to about 10 carbon atoms; X is selected from the group consisting of —OR and —OR'; R' is selected from the group consisting of benzoxazolyl, benzothiazolyl and phenyltetrazolyl; X' is selected from the group consisting of X and tetrahydropyranyloxy; Y is selected from the group consisting of hydrogen, amino, nitro and hydroxyl, wherein at least one Y is amino, nitro or hydroxyl; and provided that at least one of X and X' is selected from the group consisting of tetrahydropyranyloxy, benzoxazolyloxy, benzothiazolyloxy, and phenyltetrazolyloxy.

22. A compound having the formula:

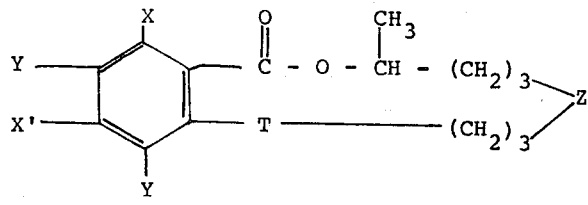

wherein T is a radical selected from the group consisting of —CH=CH— and —CH$_2$CH$_2$—; Z is a radical selected from the group consisting of >C=O, >CH$_2$, and >CHOR; R is selected from the group consisting of hydrogen, lower alkyl, lower acyclic carboxylic acid acyl radicals, and monocyclic carbocyclic aralkyl radicals containing up to about 10 carbon atoms; X is selected from the group consisting of hydrogen, —OR and —OR'; R' is selected from the group consisting of benzoxazolyl, benzothiazolyl and phenyltetrazolyl; and X' is OR'; Y is selected from the group consisting of hydrogen, amino, nitro and hydroxyl.

23. A compound having the formula:

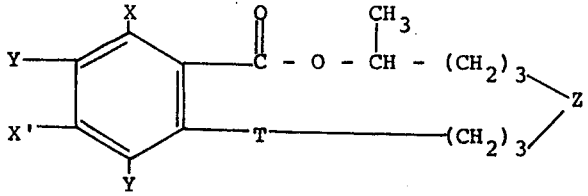

wherein T is a radical selected from the group consisting of —CH=CH— and —CH$_2$CH$_2$—; Z is a radical selected from the group consisting of >C=O, >CH$_2$, and >CHOR; R is selected from the group consisting of hydrogen, lower alkyl, lower acyclic carboxylic acid acyl radicals, and monocyclic carbocyclic aralkyl radicals containing up to about 10 carbon atoms; X is selected from the group consisting of hydrogen, —OR and —OR'; R' is selected from the group consisting of benzoxazolyl, benzothiazolyl and phenyltetrazolyl; X' is selected from the group consisting of X and tetrahydropyranyloxy; Y is selected from the group consisting of hydrogen, amino, nitro and hydroxyl, wherein at least one of Y is amino or nitro; and provided that unless at least one of X and X' is selected from the group consisting of tetrahydropyranyloxy, benzoxazolyloxy, benzothiazolyloxy, and phenyltetrazolyloxy, then at least one of X and X' is hydrogen.

24. A compound of claim 23 wherein Z is >C=O.

25. A compound of claim 24 wherein X is hydrogen.

26. A compound of claim 24 wherein X' is hydrogen.

27. A compound of claim 24 wherein X and X' are hydrogen.

28. A process for preparing a compound having the formula:

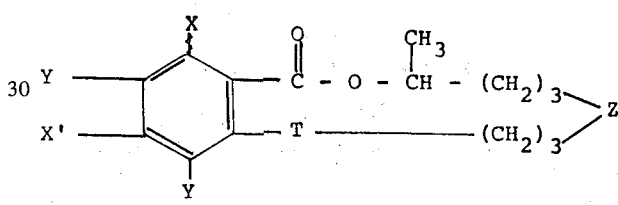

wherein T is a radical selected from the group consisting of —CH=CH— and —CH$_2$CH$_2$—; Z is a radical selected from the group consisting of >C=O, >CH$_2$, and >CHOR; R is selected from the group consisting of hydrogen, lower alkyl, lower acyclic carboxylic acid acyl radicals, and monocyclic carbocyclic aralkyl radicals containing up to about 10 carbon atoms; X is selected from the group consisting of hydrogen, —OR and —OR'; R' is selected from the group consisting of benzoxazolyl, benzothiazolyl and phenyltetrazolyl; X' is selected from the group consisting of X and tetrahydropyranyloxy; Y is selected from the group consisting of hydrogen, amino, nitro and hydroxyl; and provided that unless at least one of X and X' is selected from the group consisting of tetrahydropyranyloxy, benzoxazolyloxy, benzothiazolyloxy, and phenyltetrazolyloxy, then at least one of X and X' is hydrogen, comprising selectively etherifying at least one of the 2 and 4 positions of the A ring of compounds having the formula:

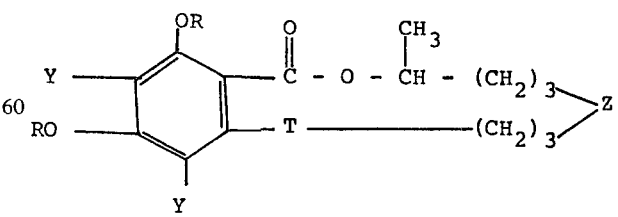

wherein R, T, Y and Z have the same values as set forth above, with a heterocyclic etherifying agent selected from the group consisting of halo-benzothiazoles, halo-benzoxazoles and halo-tetrazoles containing from about 5 to 20 carbon atoms under etherifying conditions to produce the corresponding intermediate compound containing the heterocyclic ether group in at least one of the 2 and 4 positions of the A ring and cleaving the heterocyclic ether group-containing intermediate compound by hydrogenolysis under hydrogenolyzing conditions.

29. The process of claim 28 wherein R is hydrogen and the heterocyclic etherifying agent is selected from the group consisting of 2-chlorobenzothiazole, 2-chlorobenzoxazole, and 1-phenyl-5-chlorotetrazole.

30. The process of claim 29 wherein Y is hydrogen and Z is > $CH_2$.

31. The process of claim 29 wherein Y is hydrogen and Z is > C=O.

32. The process of claim 30 wherein a heterocyclic ether group is hydrogenolyzed under hydrogenolyzing conditions including hydrogen and a Group VIII metal catalyst.

33. The process of claim 31 wherein a heterocyclic ether group is hydrogenolyzed under hydrogenolyzing conditions including hydrogen and a Group of VIII metal catalyst.

34. The process of claim 32 wherein the hydrogenolyzing conditions include temperatures from about 50° to 100°C. and the catalyst is used in a ratio from about 0.02 to 2 grams of catalyst per gram of compound to be subjected to hydrogenolysis.

35. The process of claim 33 wherein the hydrogenolyzing conditions include temperatures from about 50° to 100°C. and the catalyst is used in a ratio from about 0.02 to 2 grams of catalyst per gram of compound to be subjected to hydrogenolysis.

36. The process of claim 34 wherein one X of the starting compound is hydroxyl and it is protected against cleavage by converting the hydroxyl group to a masking ether group and subsequently removing the masking group to regenerate the hydroxyl group.

37. The process of claim 35 wherein one X of the starting compound is hydroxyl and it is protected against cleavage by converting the hydroxyl group to a masking ether group and subsequently removing the masking group to regenerate the hydroxyl group.

38. The process of claim 34 for producing dideoxyzearalane wherein zearalane is etherified with 2-chloro-benzoxazole as the heterocyclic etherifying agent in the presence of potassium carbonate to produce a heterocyclic ether group in each of the 2 and 4 positions of the A ring and each of these heterocyclic ether groups is cleaved by hydrogenolysis under hydrogenolysis conditions wherein the Group VIII metal catalyst is palladium and pressures from about 15 to 100 p.s.i. are used.

39. The process of claim 28 wherein the heterocyclic ether compound of the formula 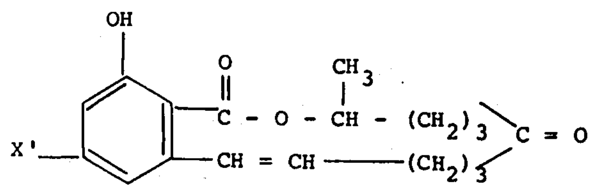 in which X′ is a tetrahydropyranyloxy radical is first produced by reacting zearalenone with dihydropyran and the resulting tetrahydropyranyloxy compound is further reacted with 1-phenyl-5-chlorotetrazole to produce the corresponding compound with a phenyltetrazolyloxy radical in the 2 position of the A ring which is subjected to hydrogenolysis to produce the compound

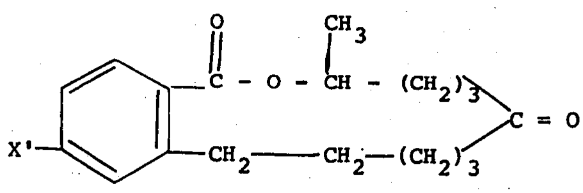

40. The process of claim 39 wherein the compound produced by hydrogenolysis is subjected to hydrolysis.

* * * * *

UNITED STATES PATENT OFFICE
CERTIFICATE OF CORRECTION

PATENT NO. : 3,887,583
DATED : June 3, 1975
INVENTOR(S) : Herbert L. Wehrmeister, et al.

It is certified that error appears in the above-identified patent and that said Letters Patent are hereby corrected as shown below:

COLUMN 2, line 8, the word "or" should be changed to read --of--.

, line 50, change "(P.E.S.)" to read --(F.E.S.)--.

, line 52, omit the second instance of the words "l-zearalenone".

, line 56, omit "(184-530A)".

COLUMN 4, line 11, change "(184-466A)" to read --now U. S. Patent No. 3,373,039)--.

COLUMN 6, line 65, in the formula, the part reading "—$CH_2$-$CH_2$-$(CH_2)_3$" should read -- —$CH=CH$-$(CH_2)_3$--.

COLUMN 10, line 8, in the formula, the "X", located at the left-corner of the hexagon, should read --X'--.

COLUMN 10, TABLES I, II and III, the last column of each table is incorrect. See attached pages for changes.

Signed and Sealed this ninth Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION - Page Two

PATENT NO. : 3,887,583
DATED : June 3, 1975
INVENTOR(S) : Herbert L. Wehrmeister, et al.

It is certified that error appears in the above-identified patent and that said Letters Patent are hereby corrected as shown below:

TABLE I should read as follows:

TABLE I

Starting Compounds

| EXAMPLE | R (2 position) | R (4 position) | T | Z | Etherifying Agent |
|---|---|---|---|---|---|
| XI | H | H | $-(CH_2)_2-$ | $>C=O$ | 2-chlorobenzothiazole |
| XII | $CH_3$ | H | do | $>CHOCH_3$ | 2-chlorobenzoxazole |
| XIII | H | acetyl | do | $>CH_2$ | do |
| XIV | acetyl | H | $-CH=CH-$ | $>C=O$ | do |
| XV | H | $CH_3$ | do | $>CHOH$ | do |
| XVI | H | benzyl | do | $>C<^{H}_{O-C(=O)-CH_3}$ | do |
| XVII | H | benzyl | do | $>CHO-benzyl$ | do |

Signed and Sealed this ninth Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION - Page Three

PATENT NO. : 3,887,583
DATED : June 3, 1975
INVENTOR(S) : Herbert L. Wehrmeister, et al.

It is certified that error appears in the above-identified patent and that said Letters Patent are hereby corrected as shown below:

TABLE II should read as follows:

TABLE II

| EXAMPLE | X | X' | Y | T | Z |
|---|---|---|---|---|---|
| XI | benzothiazolyloxy | benzothiazolyloxy | H | $-CH_2CH_2-$ | $>C=O$ |
| XII | $-OCH_3$ | benzoxazolyloxy | do | do | $>CHOCH_3$ |
| XIII | benzoxazolyloxy | acetoxy | do | do | $>CH_2$ |
| XIV | acetoxy | benzoxazolyloxy | do | $-CH=CH-$ | $>C=O$ |
| XV | benzoxazolyloxy | $-OCH_3$ | do | do | $>CHOH$ |
| XVI | do | benzyloxy | do | do | $>C(H)(O-C(=O)-CH_3)$ |
| XVII | do | do | do | do | $>CHO-Benzyl$ |

Signed and Sealed this ninth Day of September 1975

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION - Page Four

PATENT NO. : 3,887,583
DATED : June 3, 1975
INVENTOR(S) : Herbert L. Wehrmeister, et al.

It is certified that error appears in the above-identified patent and that said Letters Patent are hereby corrected as shown below:

TABLE III should read as follows:

-- TABLE III

| EXAMPLE | X | X' | Y | Z |
|---------|---|----|---|---|
| XI | H | H | H | >C=O |
| XII | -OCH$_3$ | H | do | >CHOCH$_3$ |
| XIII | H | acetoxy | do | >CH$_2$ |
| XIV | acetoxy | H | do | >C=O |
| XV | H | -OCH$_3$ | do | >CHOH |
| XVI | do | -OH | do | >C(H)(O-C(=O)-CH$_3$) |
| XVII | do | do | do | >CHOH |

Signed and Sealed this ninth Day of September 1975

[SEAL]

Attest:

RUTH C. MASON
Attesting Officer

C. MARSHALL DANN
Commissioner of Patents and Trademarks